N. M. BAKER.
OPHTHALMIC MOUNTING.
APPLICATION FILED MAR. 23, 1914.
1,098,421.
Patented June 2, 1914.
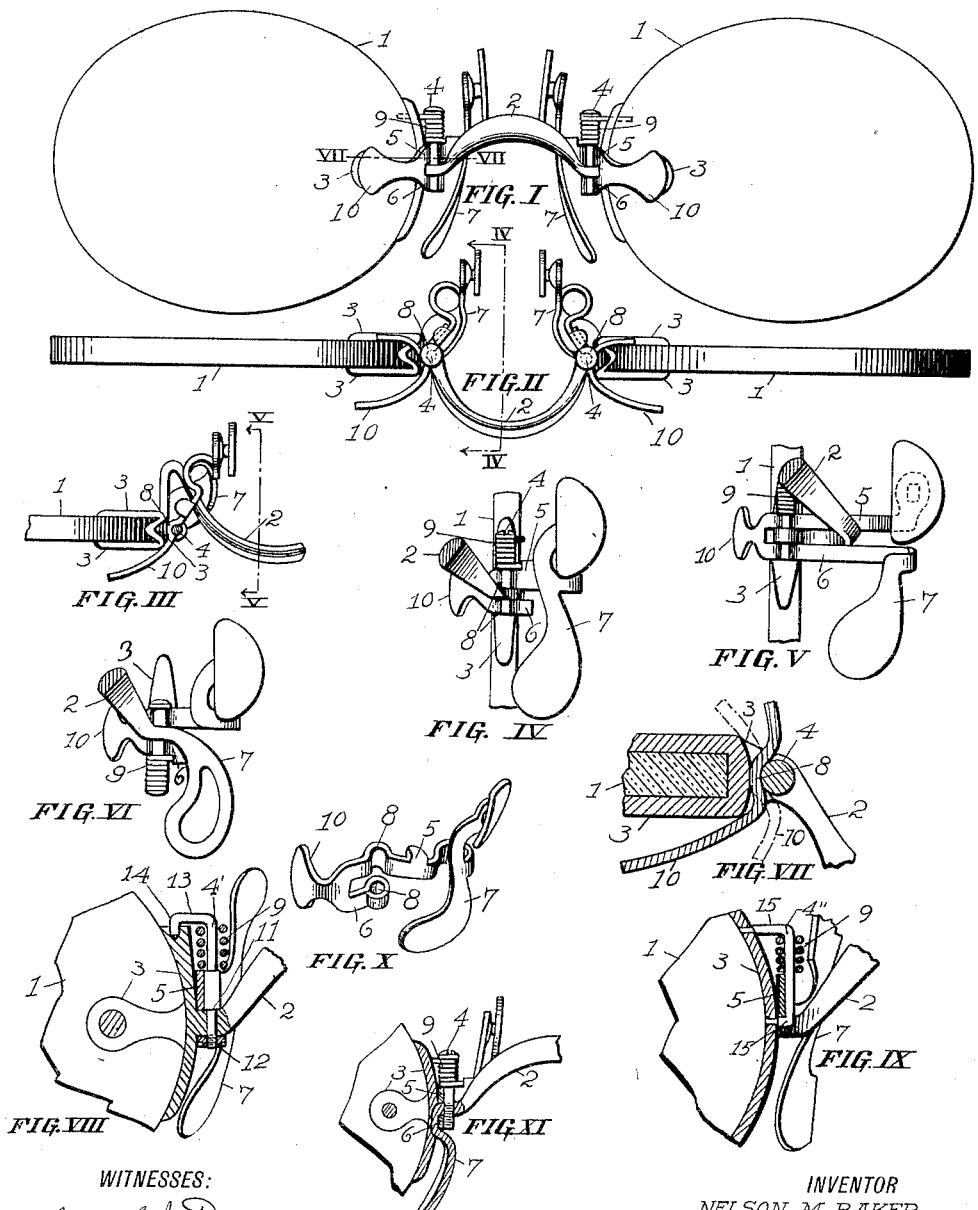
WITNESSES:
Joseph J. Demery
Florence E. Coderre
INVENTOR
NELSON M. BAKER
BY
H. H. Stytt & H. K. Parsons
ATTORNEYS

UNITED STATES PATENT OFFICE.

NELSON M. BAKER, OF SOUTHBRIDGE, MASSACHUSETTS.

OPHTHALMIC MOUNTING.

1,098,421.   Specification of Letters Patent.   Patented June 2, 1914.

Application filed March 23, 1914. Serial No. 826,591.

*To all whom it may concern:*

Be it known that I, NELSON M. BAKER, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings and has particular reference to an improved mounting of the pince-nez type, that is, a mounting retained in position on the face of the wearer by means gripping the nose as distinguished from those types of mountings retained in place solely by temples.

One of the objects of my invention is the provision of an improved ophthalmic mounting which shall have an extremely narrow pupillary distance for a mounting of this character, a further object of my invention being the provision of a mounting in which the various parts can be readily and inexpensively manufactured and assembled.

Another object of my invention is the provision of an improved construction which may be readily applied to various types of mountings at present in use, if desired, with but slight changes in the said present construction.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a view in elevation of one form of my mounting. Fig. II represents a top plan view thereof. Fig. III represents a similar view of a slightly modified form of construction. Fig. IV represents a sectional view on the line IV—IV of Fig. II. Fig. V represents a similar view on the line V—V of Fig. III. Fig. VI represents a similar view of another slightly modified form of my invention. Fig. VII represents a sectional view on the line VII—VII of Fig. I. Fig. VIII represents a fragmentary sectional view in elevation. Fig. IX represents a similar view of another slight modification of my invention. Fig. X represents a perspective view of a guard arm having a closed lower bearing, and Fig. XI represents a view partly in section of a one piece bridge and bearing member construction.

I have not attempted in the drawings to illustrate all of the possible embodiments of my invention, but for a proper understanding of the same have merely shown a few characteristic examples of the different forms which the same may assume.

The numeral 1 is employed to denote the lenses of a mounting connected by a bridge member 2 having suitable lens engaging members 3 consisting of frame, rimless attachment, or the like, as may be desired. By reference to the drawings it will be noted that in some of the forms I have illustrated the use of an ordinary arched or C bridge, while in other forms I show what is commonly termed a saddle bridge, thus illustrating that my invention is equally applicable for use with any form of bridge or lens connecting member for the lenses.

In that form of my invention illustrated in Fig. I, I mount at each end of the bridge a pivot pin, screw, rivet or the like, 4, which is spaced but slightly from the adjacent lens engaging member 3. In this particular instance I have illustrated the pivot 4 as projecting both above and below the bridge 2, while spanning the bridge 2 are the arms 5 and 6 of my guard or nose gripping member. In this particular instance the gripping member 7 is shown as carried by one of said arms, although in Fig. V I have shown a gripping member carried by the arm 5 and a second gripping member carried by the arm 6. I wish at this time to call particular attention to the fact that the material of both the arms 5 and 6 is disposed entirely in a vertical plane and that said arms have an offset 8 formed therein so that the arms curve or fit partially around the pivot 4. By reference particularly to Fig. VII the purpose of this offset should be readily apparent, and it will be observed that the outer side of the offset rests and has a bearing against the member 3, while the inner side bears against the pivot 4, the space being just sufficient to permit of sliding or rocking movement of the lever between the parts, and the offset being enough to prevent normally disengagement of the lever. The lever may be actuated to engage the nose in various ways, having been illustrated in the drawings as actuated by a spring 9 carried by the pivot having one end engaging the member 3 and the other one of the guard arms thus serving to swing the guard inward. I preferably provide a handle 10 on the front face of the mounting to facilitate manipulation of the guard arm and guard lever, although it will be understood that the presence of this handle is not essential to the fulfilment of the broadest idea of my invention.

In that form of my invention illustrated in Fig. VI, I have shown one of the nose bearing members as fixed in rigid position relative to the mounting and preferably forming substantially a continuation of the arch of the bridge, while my guard arm fits against the outer face of the bridge, an extremely narrow pupillary distance being thus attained.

In Fig. VIII, I have shown one modification of my invention which could be employed either with an ordinary spectacle or like bridge, or with an especially constructed mounting. In this form I drill the terminus of the bridge and pass therethrough the pivot 4', preferably provided with a shoulder at 11 to limit the downward movement of the pin 4' through the bridge, a nut 12 being engaged on the lower end of the pin to lock the same in position. At the upper end I form the pin in substantially U shape having the horizontally extending portion 13 and an end 14, which in this instance I have shown as extended downward and fitting into an aperture formed in the upper end of the strap 3, which has been preferably slightly thickened at its outer end. With this construction it is merely necessary to form apertures for the end of the pivot 4' and for the portion 14, then place the spring and lever in position around the pivot and tighten the nut, when the whole device may be readily secured in place on any mounting. In Fig. IX, I have shown a slight variation of this idea, in which I employ the pivot 4" having a laterally extending portion 15 at each end, said portions 15 being projected through the member 3 and riveted, soldered or otherwise suitably secured in place, the lever fitting and rocking between the lens attachment 3 and the pin 4", while the spring encircles said pin. This form is particularly advantageous in applying my improved mounting to either frame or rimless construction, as it requires absolutely no alteration of the parts of the ordinary mounting other than the securing of the member 4" thereto in some suitable manner.

It is to be noted in connection with the majority of forms of my invention that when the guard arms are swung outward or into inoperative position to the farthest extent possible, if the spring be disengaged therefrom the offset 8 may be sprung past the pivot 4 to disengage the parts therefrom when the arm may be readily removed either by straight forward movement and then vertically past the end of the arm 6, when the guard is carried by the arm 5, or by twisting the guard into a vertical plane after it has been moved away from the pivot, in the case of a double construction, such as illustrated in Fig. V for example. In either event the guard may be removed without disturbance of the spring if so desired. The facility of removal and replacement of parts is also particularly present in those forms shown in Figs. VIII and IX, since the parts may be removed either by removing the pivot 4' or 4", or may be independently removed by sliding out the guard when it is desired to remove and replace the guard, or by twisting on or off the spring, that is to say, by getting one end of the spring around the pivot and then simply turning the spring and feeding it onto the pivot with a screw action. I wish also to call particular attention to the simplicity of construction of my present mounting, in that the guard and arm may be stamped from sheet metal and the offset 8 formed therein at the time of stamping, thus eliminating the necessity for twisting or bending the guard arm to put a portion of the material in one plane, to receive the pivot and a portion in another plane, to facilitate the adjustment thereof, and to properly support the guard, as is at present necessary. A further advantage of this construction is the ease with which the guard may be shaped up, that is, the arm looped or otherwise bent as desired, and the handle bent to occupy correct position on the face of the mounting, in place of the necessity for right angle bends and twists as are required by the present known forms of construction. From the foregoing description it should, therefore, be apparent that I have provided an improved mounting, which by having the material thereof in a vertical rather than in a horizontal plane adjacent the pivot, provides an extremely narrow pupillary distance mounting, eliminating the necessity of wide pivot seats to allow for sufficient strength in the lever arm and for swinging of the arm; also that I have provided a mounting in which the parts may be more readily constructed, more easily assembled or removed, which will involve less operations in manufacture, less expensive dies, and consequently materially reduce the cost of manufacture. In addition I would again mention the possibility of attachment of my construction to ordinary mountings not of the pince-nez type now in use, thus enabling persons having an old mounting to bring the same up to date instead of having to throw it away.

I claim:—

1. A guard arm having the material thereof disposed in a vertical plane and formed with an offset to receive the pivot.

2. A mounting of the character described comprising a support, a pivot projecting from opposite sides thereof, a lever having arms resting on opposite sides of the support and detachably engaging the pivot, and means exterior to the lever and support for actuating the lever.

3. In a mounting of the character described, the combination with a support, of a lens engaging member secured thereto, a pivot projecting from the support in close proximity to the lens engaging member, and a lever having the material thereof disposed entirely in vertical planes and having a rounding portion fitting between and in sliding engagement with the pivot and the lens engaging member.

4. A mounting of the character described embodying a bridge, a lens engaging member, a pivot projecting from the bridge adjacent the lens engaging member, a lever having its material disposed in a vertical plane and having an offset formed therein, the said offset receiving the pivot and having sliding engagement with the adjacent portion of the lens attachment whereby the lever is held against movement away from the pivot and an actuating spring for the lever mounted on the pivot exterior to the lever.

5. The combination with a support, of a pivot rising therefrom, a lever having its material disposed parallel to the pivot, and an open bearing connecting the lever and pivot.

6. In a mounting of the character described, the combination with a support and a pivot carried thereby, of a lever having its material disposed entirely in a vertical plane, said lever being formed with an open bearing for engaging the pivot, and means engaging the outer face of the lever for preventing disengagement of the pivot and bearing.

In testimony whereof I affix my signature in presence of two witnesses.

NELSON M. BAKER.

Witnesses:
FLORENCE E. CODERRE,
ESTHER M. SHERIDAN.